United States Patent
Shioya et al.

(10) Patent No.: US 7,280,877 B2
(45) Date of Patent: Oct. 9, 2007

(54) FACILITY CONTROL MONITOR METHOD AND FACILITY CONTROL MONITOR APPARATUS

(75) Inventors: Masaki Shioya, Tokyo (JP); Noriyasu Sagara, Tokyo (JP); Yuji Tsubota, Tokyo (JP)

(73) Assignee: Kajima Corporation, Tokyo (JP)

( * ) Notice: Subject to any disclaimer, the term of this patent is extended or adjusted under 35 U.S.C. 154(b) by 433 days.

(21) Appl. No.: 10/822,266

(22) Filed: Apr. 8, 2004

(65) Prior Publication Data
US 2004/0193294 A1 Sep. 30, 2004

Related U.S. Application Data

(63) Continuation of application No. PCT/JP02/11132, filed on Oct. 28, 2002.

(51) Int. Cl.
G05B 11/01 (2006.01)
G05B 15/00 (2006.01)
G06F 9/44 (2006.01)
G06F 9/45 (2006.01)

(52) U.S. Cl. .............. 700/17; 700/18; 700/83; 717/132; 717/144

(58) Field of Classification Search ............ 700/17–18, 700/83; 717/132, 144
See application file for complete search history.

(56) References Cited

FOREIGN PATENT DOCUMENTS

| JP | 04-338744 | 12/1992 |
| JP | 10171531 | 6/1998 |
| JP | 2001154711 | 6/2001 |
| JP | 2001216019 | 8/2001 |

Primary Examiner—Ron D Hartman, Jr.
(74) Attorney, Agent, or Firm—Gauthier & Connors LLP

(57) ABSTRACT

A facility control monitor method and a facility control monitor apparatus capable of visually tracing a control logic and easily finding a cause of an operation trouble caused by the control logic. The facility control monitor method monitors control performed by a control device included in a facility having a controllable device, the control device for controlling the controllable device, a setting device for transmitting a setting control value to the control device, and a sensor for transmitting an operation state measurement value of the controllable device to the control device. Processes of control performed by the control device are stored. When an arbitrary date and time is specified by a trace controller (35), predetermined control steps of the specified date and time and after are displayed in a flowchart on a control flow display unit.

4 Claims, 10 Drawing Sheets

Fig. 4

|   | A | B | C | D | E | F | G |
|---|---|---|---|---|---|---|---|
| 1 |   |   |   |   |   | AHU-1 |   |
| 2 | SELECTED DATE | SELECTED TIME | DATE AND TIME | Index | START SIGNAL | AIR FEED TEMPERATURE | ROOM |
| 3 | 2000-05-10 | 09:00 | 2000-05-10 09:00 | 1351 | 1 | 27 | 27. |
| 4 |   |   |   |   |   |   |   |
| 5 | SELECTED VAV |   | PLACE | Index | MAXIMUM AIR FLOW AMOUNT | MINIMUM AIR FLOW AMOUNT | DEVIATION DURING |
| 6 | VAV-3 |   | 1F OFFICE (SOUTHWEST) | 3 | 4158 | 850 |   |

SPECIFIED DATE  2000-05-10 ▼     TIME  09:00 ▼

VAV  VAV-3 ▼

GRAPH DISPLAY 1   AHU-1 LINE VAV AIR FEED TEMPERATURE ▼
GRAPH DISPLAY 2   VAV-3 1F RECEPTION ROOM TEMPERATURE ▼
GRAPH DISPLAY 3   VAV-3 REQUIRED AIR FLOW AMOUNT ▼
GRAPH DISPLAY 4   ▼
GRAPH DISPLAY 5   ▼
GRAPH DISPLAY 6   ▼
RANGE OF GRAPH   07:00▼ ~ 23:50▼

43

CONTROLLER / SETTING PARAMETER / TIME SEQUENTIAL MEASURED DATA

Fig. 5

| | A | B | C | D | E | F | G |
|---|---|---|---|---|---|---|---|
| 1 | | | | MAXIMUM AIR FLOW AMOUNT | MINIMUM AIR FLOW AMOUNT | CRITICAL AIR FLOW AMOUNT DURING COOLING | CRITICAL AIR FLOW AMOUNT DURING HEATING |
| 2 | | | | m3/h | m3/h | m3/h | m3/h |
| 3 | VAN1 | 1 | 1F RECEPTION ROOM | 290 | 60 | 147 | 203 |
| 4 | VAN2 | 2 | 1F OFFICE (NORTHWEST) | 2079 | 425 | 1048.7 | 1455.3 |
| 5 | VAN3 | 3 | 1F OFFICE (SOUTHWEST) | 4158 | 850 | 2097.4 | 2910.6 |
| 6 | VAN4 | 4 | 1F OFFICE INTERIOR (NORTH) | 1380 | 600 | 1014 | 966 |
| 7 | VAN5 | 5 | 1F OFFICE INTERIOR (EAST) | 1380 | 600 | 1014 | 966 |
| 8 | VAN6 | 6 | 1F OFFICE INTERIOR (SOUTH) | 1380 | 600 | 1014 | 966 |
| 9 | VAN7 | 7 | 1F OFFICE PERIMETER (NORTH) | 1380 | 0 | 414 | 966 |
| 10 | VAN8 | 8 | 1F OFFICE PERIMETER (SOUTH) | 1380 | 0 | 414 | 966 |
| 11 | VAN9 | 9 | 1F INTERIOR (EAST) | 1380 | 250 | 664 | 966 |
| 12 | VAN10 | 10 | 1F INTERIOR (WEST) | 1380 | 250 | 664 | 966 |
| 13 | VAN11 | 11 | 1F GUESTROOM INTERIOR | 1380 | 250 | 664 | 966 |
| 14 | VAN12 | 12 | 1F GUESTROOM PERIMETER | 1380 | 0 | 414 | 966 |
| 15 | VAN13 | 13 | 1F EXHIBITION ROOM PERIMETER | 1380 | 0 | 414 | 966 |
| 16 | VAN14 | 14 | 2F REFRESH CORNER | 200 | 60 | 120 | 140 |
| 17 | VAN15 | 15 | 2F HEALTH CARE ROOM | 1340 | 0 | 402 | 938 |
| 18 | VAN16 | 16 | 2F OFFICE (NORTHWEST) | 2610 | 730 | 1513 | 1827 |
| 19 | VAN17 | 17 | 2F OFFICE (SOUTHWEST) | 2320 | 650 | 1346 | 1624 |
| 20 | VAN18 | 18 | 2F OFFICE (NORTHEAST) | 2790 | 785 | 1622 | 1953 |
| 21 | VAN19 | 19 | 2F OFFICE (SOUTHEAST) | 2790 | 785 | 1622 | 1953 |
| 22 | VAN20 | 20 | 3F REFRESH CORNER | 200 | 60 | 120 | 140 |
| 23 | VAN21 | 21 | 3F MEETING ROOM C | 870 | 0 | 261 | 609 |
| 24 | VAN22 | 22 | 3F OFFICE (NORTHWEST) | 2934 | 975 | 1855.2 | 2053.8 |
| 25 | VAN23 | 23 | 3F OFFICE (SOUTHWEST) | 2934 | 975 | 1855.2 | 2053.8 |
| 26 | VAN24 | 24 | 3F OFFICE (NORTHEAST) | 3159 | 1050 | 1997.7 | 2211.3 |
| 27 | VAN25 | 25 | 3F OFFICE (SOUTHEAST) | 3167 | 1050 | 2000.1 | 2216.9 |
| 28 | VAN26 | 26 | 4F RESTAURANT | 3120 | 1820 | 2756 | 2184 |
| 29 | VAN27 | 27 | 4F CONVENTION BUREAU (WEST) | 1400 | 0 | 420 | 990 |

\ CONTROLLER \ SETTING PARAMETER \ TIME SEQUENTIAL MEASURED DATA /

Fig. 5 (CONTINUED)

| H | I | J | K | L | M | N | O |
|---|---|---|---|---|---|---|---|
| PRESET COOLING DEVIATION | PRESET HEATING DEVIATION | AIR FEED LINE | NAME OF AIR FEED LINE | | | | |
| ℃ | ℃ | | | | | CONTROL STATE OF VAV | |
| 1 | 1 | 1 | AHU-1 | | | 0  AHU STOP OR SENSOR TROUBLE | |
| 1 | 1 | 1 | AHU-1 | | | 1  REQUIRE FOR INCREASE IN COOLING PERFORMANCE | |
| 1 | 1 | 1 | AHU-1 | | | 2  PROPER COOLING | |
| 1 | 1 | 1 | AHU-1 | | | 3  FULL OPEN STATE | |
| 1 | 1 | 1 | AHU-1 | | | 4  PROPER HEATING | |
| 1 | 1 | 1 | AHU-1 | | | 5  REQUIRE FOR INCREASE IN HEATING PERFORMANCE | |
| 1 | 1 | 1 | AHU-1 | | | 6  REQUIRE FOR PROPER COOLING | |
| 1 | 1 | 1 | AHU-1 | | | 7  REQUIRE FOR PROPER HEATING | |
| 1 | 1 | 1 | AHU-1 | | | | |
| 1 | 1 | 1 | AHU-1 | | | | |
| 1 | 1 | 1 | AHU-1 | | | | |
| 1 | 1 | 1 | AHU-1 | | | | |
| 1 | 1 | 2 | AHU-2 | | | | |
| 1 | 1 | 2 | AHU-2 | | | | |
| 1 | 1 | 2 | AHU-2 | | | | |
| 1 | 1 | 2 | AHU-2 | | | | |
| 1 | 1 | 2 | AHU-2 | | | | |
| 1 | 1 | 2 | AHU-2 | | | | |
| 1 | 1 | 2 | AHU-2 | | | | |
| 1 | 1 | 2 | AHU-2 | | | | |
| 1 | 1 | 2 | AHU-2 | | | | |
| 1 | 1 | 2 | AHU-2 | | | | |
| 1 | 1 | 2 | AHU-2 | | | | |
| 1 | 1 | 2 | AHU-2 | | | | |
| 1 | 1 | 2 | AHU-2 | | | | |
| 1 | 1 | 2 | AHU-2 | | | | |

Fig. 6

| | A | B | C | D | E | F | G |
|---|---|---|---|---|---|---|---|
| 1 | | | | | AHU-1 LINE VAV START SIGNAL | AHU-1 LINE VAV AIR FEED TEMPERATURE | AHU-2 LINE VAV START SIGNAL |
| 2 | DATE | TIME | | | AHU-001 | TEMP-001 | AHU-00 |
| 3 | | | | | ON/OFF | ℃ | ON/OFF |
| 4 | 20000501 | 0 | 2000-05-01 00:00 | 1 | 0.0 | 23.2 | 0.0 |
| 5 | 20000501 | 1000 | 2000-05-01 00:10 | 2 | 0.0 | 23.2 | 0.0 |
| 6 | 20000501 | 2000 | 2000-05-01 00:20 | 3 | 0.0 | 23.2 | 0.0 |
| 7 | 20000501 | 3000 | 2000-05-01 00:30 | 4 | 0.0 | 23.2 | 0.0 |
| 8 | 20000501 | 4000 | 2000-05-01 00:40 | 5 | 0.0 | 23.1 | 0.0 |
| 9 | 20000501 | 5000 | 2000-05-01 00:50 | 6 | 0.0 | 23.1 | 0.0 |
| 10 | 20000501 | 10000 | 2000-05-01 01:00 | 7 | 0.0 | 23.1 | 0.0 |
| 11 | 20000501 | 11000 | 2000-05-01 01:10 | 8 | 0.0 | 23.1 | 0.0 |
| 12 | 20000501 | 12000 | 2000-05-01 01:20 | 9 | 0.0 | 23.1 | 0.0 |
| 13 | 20000501 | 13000 | 2000-05-01 01:30 | 10 | 0.0 | 23.1 | 0.0 |
| 14 | 20000501 | 14000 | 2000-05-01 01:40 | 11 | 0.0 | 23.0 | 0.0 |
| 15 | 20000501 | 15000 | 2000-05-01 01:50 | 12 | 0.0 | 23.0 | 0.0 |
| 16 | 20000501 | 20000 | 2000-05-01 02:00 | 13 | 0.0 | 23.0 | 0.0 |
| 17 | 20000501 | 21000 | 2000-05-01 02:10 | 14 | 0.0 | 23.0 | 0.0 |
| 18 | 20000501 | 22000 | 2000-05-01 02:20 | 15 | 0.0 | 23.0 | 0.0 |
| 19 | 20000501 | 23000 | 2000-05-01 02:30 | 16 | 0.0 | 23.0 | 0.0 |
| 20 | 20000501 | 24000 | 2000-05-01 02:40 | 17 | 0.0 | 22.9 | 0.0 |
| 21 | 20000501 | 25000 | 2000-05-01 02:50 | 18 | 0.0 | 22.9 | 0.0 |
| 22 | 20000501 | 30000 | 2000-05-01 03:00 | 19 | 0.0 | 22.9 | 0.0 |
| 23 | 20000501 | 31000 | 2000-05-01 03:10 | 20 | 0.0 | 22.9 | 0.0 |
| 24 | 20000501 | 32000 | 2000-05-01 03:20 | 21 | 0.0 | 22.9 | 0.0 |
| 25 | 20000501 | 33000 | 2000-05-01 03:30 | 22 | 0.0 | 22.9 | 0.0 |
| 26 | 20000501 | 34000 | 2000-05-01 03:40 | 23 | 0.0 | 22.9 | 0.0 |
| 27 | 20000501 | 35000 | 2000-05-01 03:50 | 24 | 0.0 | 22.9 | 0.0 |
| 28 | 20000501 | 40000 | 2000-05-01 04:00 | 25 | 0.0 | 22.9 | 0.0 |
| 29 | 20000501 | 41000 | 2000-05-01 04:10 | 26 | 0.0 | 22.8 | 0.0 |
| 30 | 20000501 | 42000 | 2000-05-01 04:20 | 27 | 0.0 | 22.8 | 0.0 |
| 31 | 20000501 | 43000 | 2000-05-01 04:30 | 28 | 0.0 | 22.8 | 0.0 |
| 32 | 20000501 | 44000 | 2000-05-01 04:40 | 29 | 0.0 | 22.8 | 0.0 |
| 33 | 20000501 | 45000 | 2000-05-01 04:50 | 30 | 0.0 | 22.8 | 0.0 |

CONTROLLER / SETTING PARAMETER

Fig. 6 (CONTINUED)

| H | I | J | K | L | M | N |
|---|---|---|---|---|---|---|
| AHU-2 LINE VAV AIR FEED TEMPERATURE | VAV-1 1F RECEPTION ROOM TEMPERATURE | VAV-1 1F RECEPTION ROOM HEATING OR COOLING SETTING | VAV-1 REQUIRED AIR FLOW AMOUNT | VAV-2 1F RECEPTION ROOM TEMPERATURE | VAV-2 1F RECEPTION ROOM HEATING OR COOLING SETTING | VAV-2 REQUIRED AIR FLOW AMOUNT |
| TEMP-004 | VTE-001 | VCPA-001 | VFEA-001 | VTE-002 | VCPA-002 | VFEA-002 |
| ℃ | ℃ | ℃ | m3/h | ℃ | ℃ | m3/h |
| 22.3 | 22.1 | 23.0 | 0.0 | 26.7 | 23.0 | |
| 22.4 | 22.1 | 23.0 | 0.0 | 26.7 | 23.0 | |
| 22.4 | 22.1 | 23.0 | 0.0 | 26.6 | 23.0 | |
| 22.4 | 22.1 | 23.0 | 0.0 | 26.5 | 23.0 | |
| 22.4 | 22.1 | 23.0 | 0.0 | 26.4 | 23.0 | |
| 22.4 | 22.1 | 23.0 | 0.0 | 26.3 | 23.0 | |
| 22.5 | 22.1 | 23.0 | 0.0 | 26.2 | 23.0 | |
| 22.5 | 22.0 | 23.0 | 0.0 | 26.1 | 23.0 | |
| 22.5 | 22.0 | 23.0 | 0.0 | 26.1 | 23.0 | |
| 22.5 | 22.0 | 23.0 | 0.0 | 26.0 | 23.0 | |
| 22.5 | 22.0 | 23.0 | 0.0 | 26.0 | 23.0 | |
| 22.5 | 22.0 | 23.0 | 0.0 | 25.9 | 23.0 | |
| 22.5 | 22.0 | 23.0 | 0.0 | 25.9 | 23.0 | |
| 22.6 | 22.0 | 23.0 | 0.0 | 25.8 | 23.0 | |
| 22.6 | 22.0 | 23.0 | 0.0 | 25.8 | 23.0 | |
| 22.6 | 21.9 | 23.0 | 0.0 | 25.8 | 23.0 | |
| 22.6 | 21.9 | 23.0 | 0.0 | 25.7 | 23.0 | |
| 22.6 | 21.9 | 23.0 | 0.0 | 25.7 | 23.0 | |
| 22.6 | 21.9 | 23.0 | 0.0 | 25.7 | 23.0 | |
| 22.6 | 21.9 | 23.0 | 0.0 | 25.6 | 23.0 | |
| 22.6 | 21.9 | 23.0 | 0.0 | 25.6 | 23.0 | |
| 22.7 | 21.9 | 23.0 | 0.0 | 25.6 | 23.0 | |
| 22.7 | 21.9 | 23.0 | 0.0 | 25.6 | 23.0 | |
| 22.7 | 21.9 | 23.0 | 0.0 | 25.6 | 23.0 | |
| 22.7 | 21.9 | 23.0 | 0.0 | 25.5 | 23.0 | |
| 22.7 | 21.9 | 23.0 | 0.0 | 25.5 | 23.0 | |
| 22.7 | 21.9 | 23.0 | 0.0 | 25.5 | 23.0 | |
| 22.7 | 21.8 | 23.0 | 0.0 | 25.5 | 23.0 | |
| 22.7 | 21.8 | 23.0 | 0.0 | 25.4 | 23.0 | |
| 22.7 | 21.8 | 23.0 | 0.0 | 25.4 | 23.0 | |

FACILITY CONTROL MONITOR METHOD AND FACILITY CONTROL MONITOR APPARATUS

This application is a Continuation and hereby claims benefit under 35 U.S.C. §120 to the following application Ser. No. PCT/JP02/11132 Filing date Oct. 28, 2002.

TECHNICAL FIELD

The present invention relates to a facility control monitoring method and a facility control monitoring apparatus for monitoring control of facilities that operate devices to be controlled, such as air conditioners.

BACKGROUND ART

Conventionally, for the purpose of automatically controlling, for example, an air conditioning facility (air conditioning system) a designer specifies the basic requirements of the air conditioning system. Generally, such basic specifications do not include the control logic or parameters that are required for setting the operation level. An automatic control system supplier (company) assembles the control logic required for the actual operation level based on the basic specification to make a control flow (operation control procedure). The control flow is executed by means of software stored in a control device (for example, a computer) or by means of a program stored in a programmable sequencer. Generally, with regard to setting parameters, such as a PID (Proportional Integral Differential) parameter, the automatic control system supplier set optimal parameters by repetitive trial and error to match the characteristics of a building at the time of completion and delivery of the facility. When the facility has been delivered, generally, an operation manager monitors the operating state of the air conditioning system using a central monitoring system.

In a conventional control system for controlling devices to be controlled, such as an air conditioner, a refrigerator, a circulating pump or a generator, an automatically controlled operation is monitored through a central monitoring system. Meanwhile, for example, the quality of the automatic control of such an air conditioning system greatly influences the quality of the indoor environment and the energy consumption. Thus, automatic control of an air conditioning system requires precise monitoring of the operation, to enable rapid and easy tracing of errors and thereby enhance the operating efficiency of the system.

However, according to conventional automatic control of air conditioning systems, the automatic control system supplier must assemble the control logic at the operation level, and the control logic is executed as a program. In addition, setting parameters are also input directly into the read-only memory (ROM) of a control device in situ, so the control logic and the setting parameters become a "black box" for an operation manager or a designer of the basic requirements. For this reason, although the operational state of the air conditioning system is monitored through a central monitoring system, a cause of a trouble caused by the control logic could not be specified. In addition, even though the control flow may be displayed on a monitor of the central monitoring system, the control flow cannot be displayed in a time sequentials, so not only is it difficult to trace the control logic, but also it is impossible to confirm the propriety of the operation control.

The present invention has been made in view of the above situation and, accordingly, it is an advantage of the present invention to provide a facility control monitoring method and a facility control monitoring apparatus capable of visually tracing the control logic and easily finding a cause of an operation trouble caused by the control logic.

DISCLOSURE OF INVENTION

In order to accomplish the above advantage, according to one aspect of the present invention, there is provided a facility control monitoring method for monitoring a control performed by a control device in a facility including a device to be controlled, the control device for controlling the operation of the device to be controlled, a setting device for transmitting a setting control value to the control device, and a sensor for transmitting an operational state measured value of the device to be controlled to the control device, the method comprising the steps of storing the control procedure performed by the control device, and specifying an arbitrary date and time, displaying predetermined steps of the control procedures after or before the specified date and time on a display device as a flowchart.

According to the above facility control monitoring method the control procedure performed by the control device is stored, and the predetermined steps of the control procedure at the specified date and time are displayed as a flowchart. Accordingly, it is possible to visually trace the control logic. As a result, the control logics or setting parameters, which were previously regarded as a black box, can be recognized, and a cause of an operation trouble caused by the control logic can be easily found.

Further, in a facility control monitoring method according to another aspect of the present invention, the flowcharts of multiple lines having differently specified dates and times is simultaneously displayed on one display screen of the display device.

With this facility control monitoring method, the flowcharts of multiple lines having differently specified dates and times can be simultaneously displayed on one display screen of the display device. For example, in an air conditioning system, when the temperature of a certain room is too high, a flowchart representing the previous air conditioning control procedure, similar to the control logic of the abnormal operation, in which normal operation was performed, can be simultaneously displayed. Accordingly, it is possible to compare the operation control procedures and measured values with each other, so the suitability of the control logic and the setting control values (setting parameters) can be rapidly and easily determined.

Further, in a facility control monitoring method according to another aspect of the present invention, with the flowchart, the setting control value and the measured value, which are obtained when the control was carried out according to the flowchart, are simultaneously displayed on one display screen of the display device as numerical values.

With this facility control monitoring method, with the flowchart, the setting control value and the measured value, which are obtained when the control was carried out according to the flowchart, can be simultaneously displayed on one display screen of the display device as numerical values. That is, the operation control based on the flowchart can be visually recognized, and at the same time, the numerical setting parameters or results can be quantitatively recognized so that it is possible to precisely and easily trace the operation control.

Further, in a facility control monitoring method according to another aspect of the present invention, a transition of the setting control value and the measured value obtained during the control was carried out according to the flowchart is displayed on a display screen of the display device as a graph.

In the above facility control monitoring method, when the operation control at a certain day and time is displayed using the flowchart, a transition of the setting parameter and the measured value at the time during the operation control was performed, can be displayed in the form of a graph, which may be, for example, a line graph, a bar graph, or a pie chart. As a result, it is possible to visually recognize the transition of the control value and the measured value involved in the operation control so that the suitability of the control logic can be rapidly and easily determined.

Further, according to another aspect of the present invention, there is provided a facility control monitoring apparatus for monitoring the control performed by a control device in a facility including a device to be controlled, the control device for controlling the operation of the device to be controlled, a setting device for transmitting a setting control value to the control device, and a sensor for transmitting an operational state measured value of the device to be controlled to the control device, the apparatus comprising: a storage unit for storing the operation control values transmitted to the device to be controlled and another control equipment from the control device, and the setting control value and the measured value which were changed with the lapse of the transmission time of the operation control values; a display device and an input device; and control means for retrieving, based on a date and time input value which is input through the input device and which specifies an arbitrary date and time before input to the input device, the control operation value at the date and time corresponding to the specified date and time input value from the storage unit, and for making predetermined steps of the control operation value to be displayed on the display device as a flowchart of the control procedure.

According to the above facility control monitoring apparatus, the operation history of a device to be controlled is stored in the storage unit as the operation control value. Also, operation control value data (that is, an operation history) at a desired date and time can be extracted from the operation control value data stored in the storage unit by means of the control means. The control means allows the extracted data to be displayed on the display device in the form of a flowchart. As a result, it is possible to visually trace the control logic at any arbitrary point in time.

BRIEF DESCRIPTION OF THE DRAWINGS

FIG. 5 is a view illustrating an example of a display screen displaying setting values of control parameters; and FIG. 6 is a view illustrating an example of a display screen displaying time sequential data.

BEST MODE FOR CARRYING OUT THE INVENTION

Hereinafter, a preferred embodiment of a facility control monitoring method and a facility control monitoring apparatus according to the present invention will be described in detail with reference to FIGS. 1 to 6.

Figure 3:
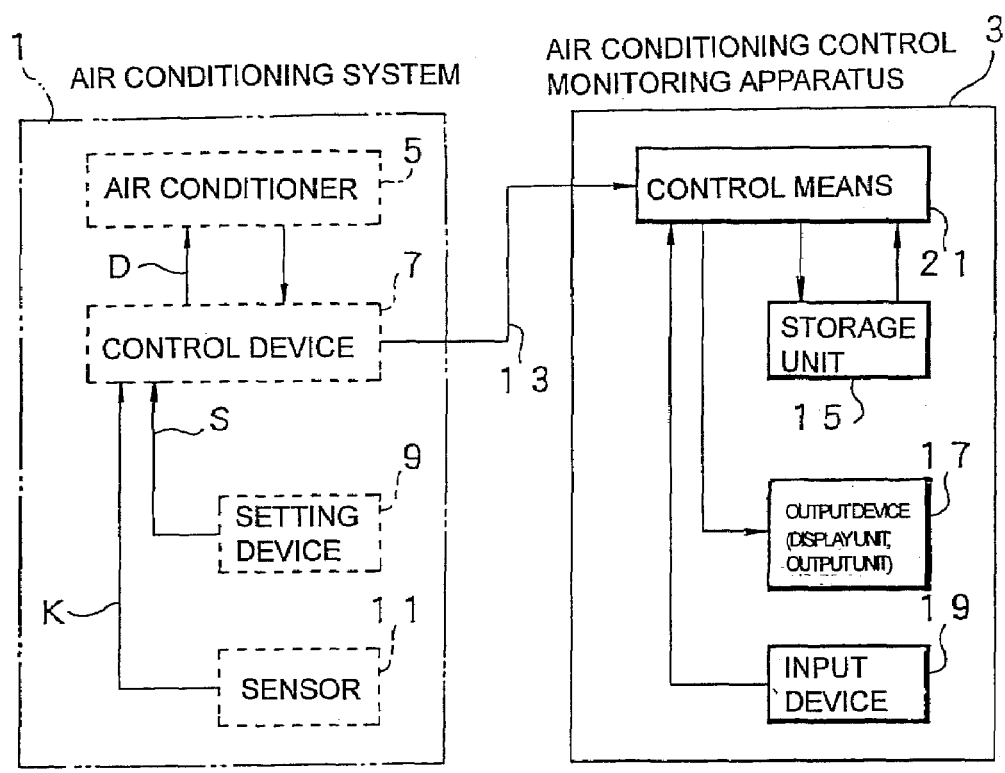
FIG. 3 is a block diagram illustrating an example of a facility control monitoring apparatus for performing the facility control monitoring method according to the present invention.

In the present embodiment, an air conditioning system 1 shown in FIG. 3 is described as the facility to be monitored. However, the facility control monitoring method and the facility control monitoring apparatus according to the present invention can be suitably applied to other facilities, for example, facilities for controlling devices to be controlled, such as a refrigerator, a circulating pump, or a generator. Hereinafter, in the present embodiment, a case in which the present invention is applied to an air conditioning facility will be described as an example.

An air conditioning system 1, which is the facility to be monitored, includes an air conditioner (device to be controlled) 5, a control device 7, a setting device 9, and a sensor 11, as main components. The air conditioner 5 also includes a blower, heating and cooling coils connected to a heating and cooling device, a variable air volume (VAV) unit, a humidifier, and the like, as additional components. The control device 7 is connected to the heating and cooling device, the variable air volume unit, and the humidifier with control signal lines, and is adapted to control the general operation of the air conditioner 5.

The control device 7 may employ a control panel enabling input of commands for execution of the air conditioning operation control logic of by combination of a plurality of control relays, a timer and the like; or a programmable sequencer connected to components of the air conditioner 5 through interfaces for controlling the operation of the above components by executing a control flow based on a predetermined program; or a computer for controlling the operation of the above components by storing the control flow therein as software.

The setting device 9 transmits a setting control value S, which is a setting parameter, to the control device 7. Examples of the setting device 9 include a temperature switch (a thermostat) or a humidity switch (a humidistat) installed in a room.

The sensor 11 transmits measured values K of temperature, humidity, or air volume to the control device 7. The sensor 11 also includes sensors installed in the air conditioner 5, a flow duct, or other air conditioning apparatuses (for example, a cooling tower, a cooling water circulating pump or the like) in addition to those installed in respective rooms to be air-conditioned.

Upon receiving control values from the setting device 9 and the sensor 11, the control device 7 controls the operation of the air conditioning system 1 on the basis of the control logic stored in the control device 7.

The control device 7 is connected to an air conditioning control monitoring apparatus 3 through a signal line 13. The air conditioning control monitoring apparatus 3 includes a storage unit 15, a display unit 17 of an output device, an input device 19 and a control means 21, as main components. The storage unit 15 stores operation control values D, which are transmitted to the air conditioner 5 and another control equipment from the control device 7 of the air conditioning system 1, the setting control value S of the setting device 9, and the measured value K of the sensor 11 at predetermined time intervals. The storage unit 15 may include a RAM capable of writing, reading and correcting data, or a storage device, such as a magnetic hard disk drive, or an optical disk reader and/or writer (CD-R or CD-RW), in which reading and/or writing can be controlled under the control of the control means 21, which will be described later.

The display unit 17 of the output device may be a CRT or a liquid crystal display screen capable of displaying arbitrary color images.

The input device 19 comprises, for example, a keyboard input device, a mouse as a pointing device, and the like.

The control means 21 allows the setting control value S and the measured value K, which are transmitted from the control device 7 of the air conditioning system 1, to be stored in a predetermined storage area of the storage unit 15. In addition, when the control means 21 receives a date and time input value specifying an arbitrary date and time before reaching the input point from the input device 19, the control means 21 retrieves the control operation value of a date and time corresponding to the specified time and date from the storage unit 15. At the same time, the control means 21 allows the control operation value to be displayed on the display unit 17 of the output device as a flowchart having predetermined steps of an air conditioning control procedure.

Moreover, if the control means 21 receives an error signal from the control device 7 of the air conditioning system 1, the control means 21 starts processing operation using the error signal as a triggering signal and displays an error message on the display unit 17 of the output device. Also, the control means 21 can automatically display, on the display unit 17 in the form of a flowchart having predetermined steps, control histories of the point of time when the error signal is generated and of an error in the past similar to the present error.

The above air conditioning control monitoring apparatus 3 comprising the storage unit 15, the display unit 17 of the output device, the input device 19, and the control means 21 may use, for example, a personal computer having a hard disk drive as the storage unit 15, a display as the display unit 17 of the output device, a keyboard or a mouse as the input device 19, and a processor (CPU) as the control means 21.

That is, the predetermined steps of the air conditioning control procedure can be displayed on the display unit 17 of the output device as a flowchart by executing the software, which is previously stored in the storage unit 15, using the control means 21. Such a flowchart may be displayed by using symbols representing processing, determination, input/output, and terminals that are symbols of an information processing flowchart.

Figure 1:
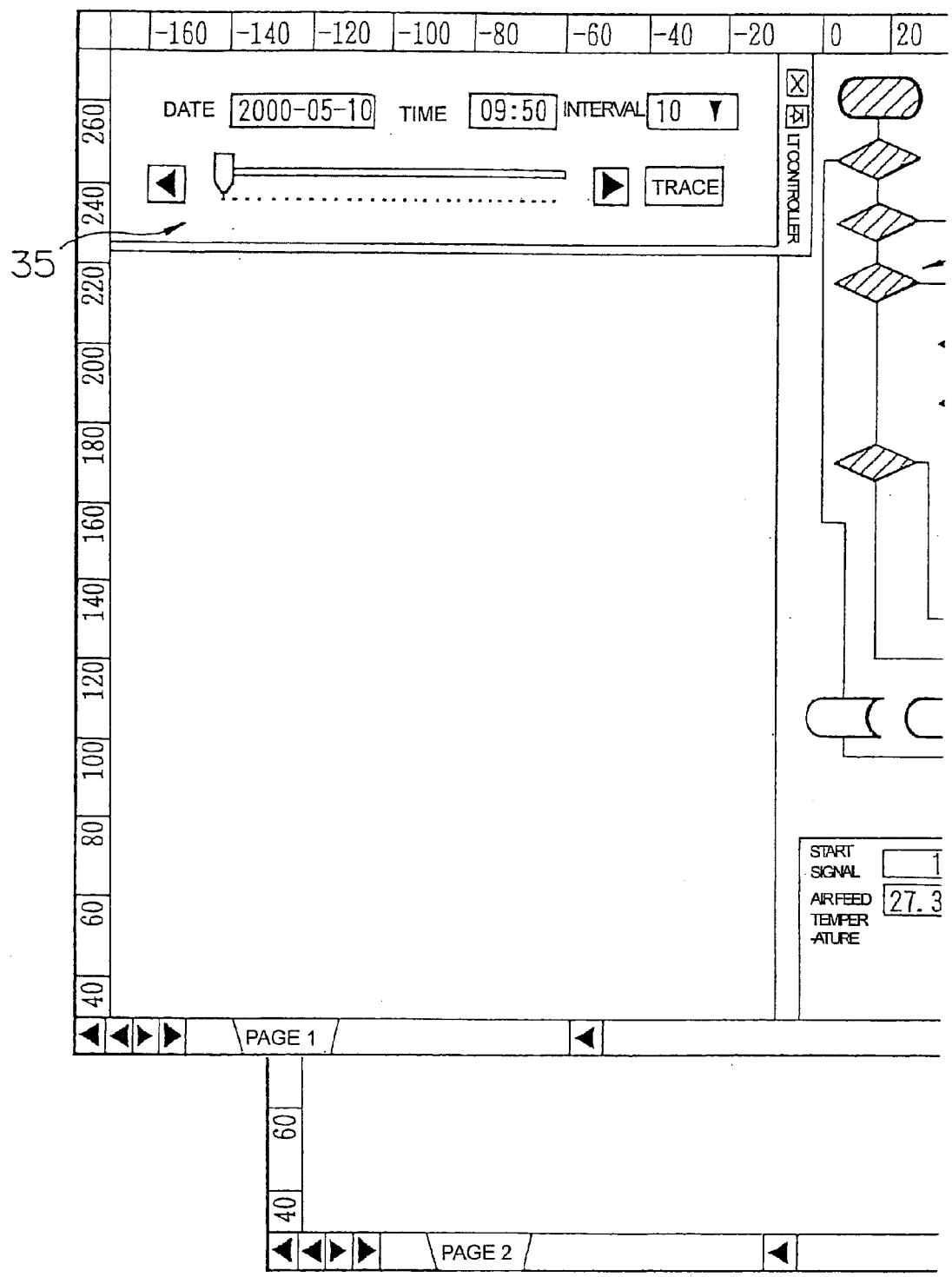
FIG. 1 is a view illustrating an example of a display screen displayed by a facility control monitoring method according to the present invention.
Figure 1:
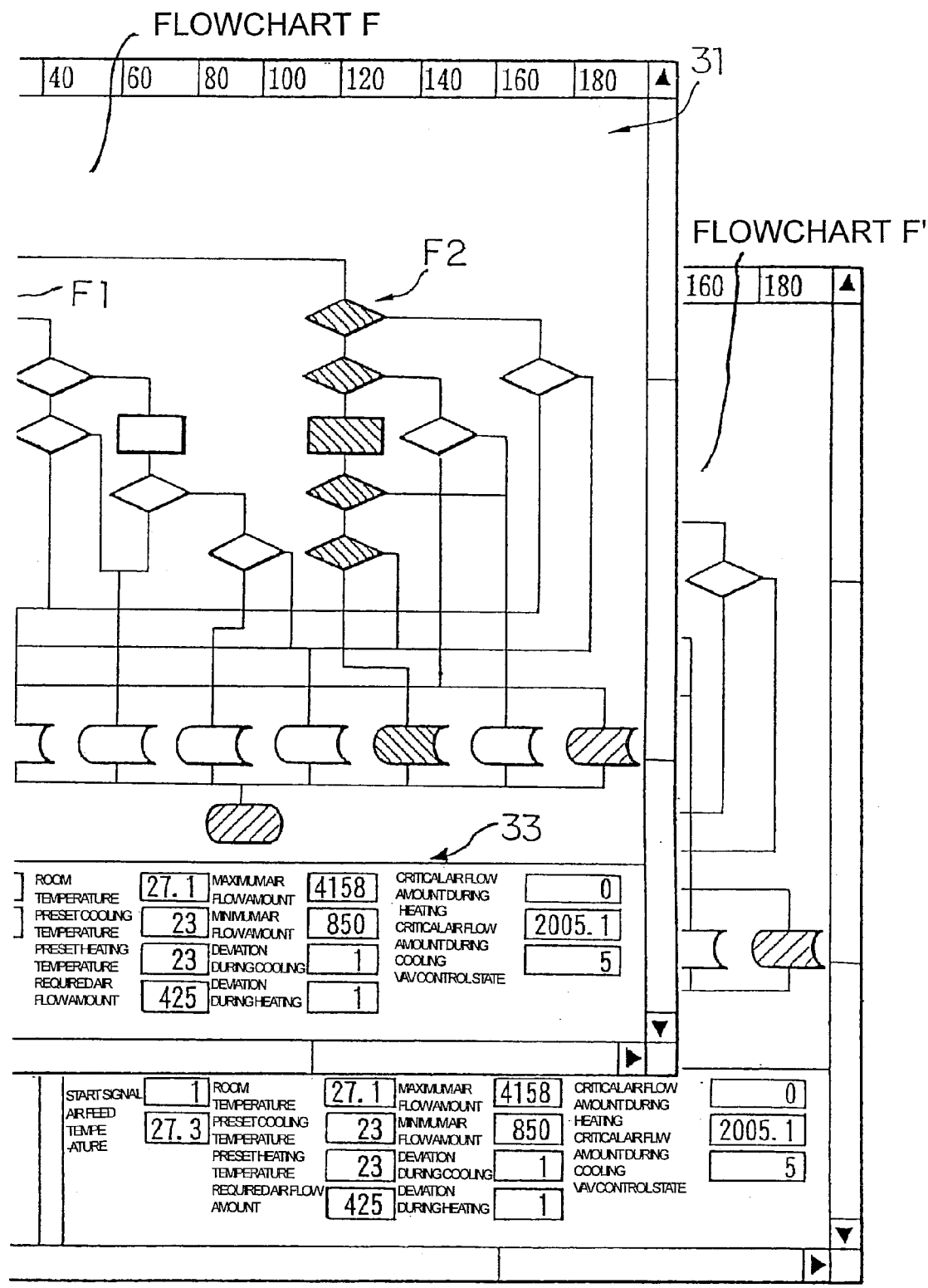

The control means 21 can simultaneously display, on one display screen of the display unit 17 of the output device as shown in FIG. 1, a flowchart of the same overall system having differently specified dates and times or a flowchart of multiple lines having the same date and time.

In addition, the control means 21 can simultaneously display, on one display screen of the display unit 17 of the output device, with a flowchart, data corresponding to the setting control value S, and measured values K obtained when the air conditioning control was carried out according to the flowchart on a set and measured data display section 33 of the display screen as shown in FIG. 1 as numerical values.

Figure 4:
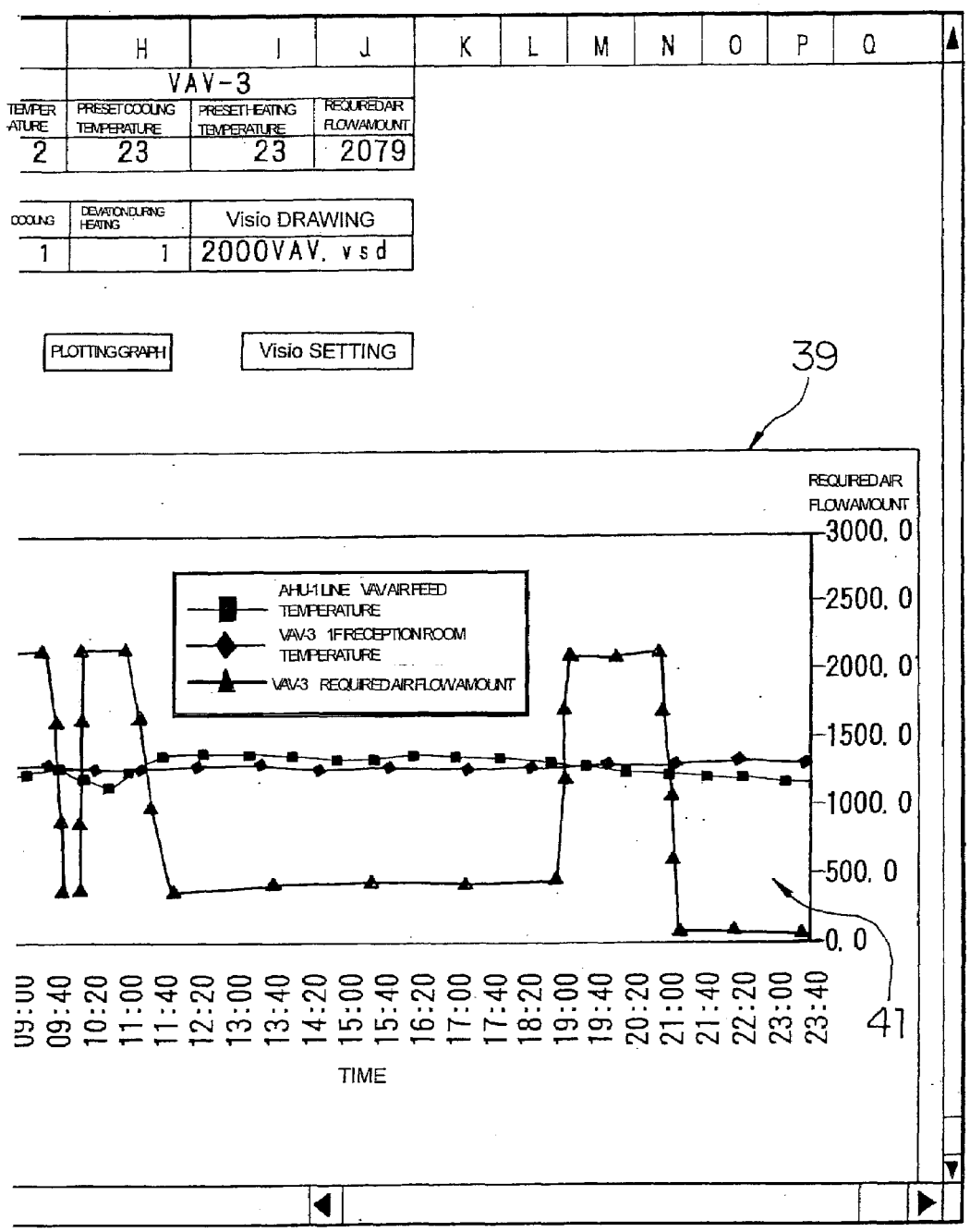
FIG. 4 is a view illustrating an example of a display screen displaying setting values of control parameters that constitutes a control logic.

Moreover, the control means 21 allows a transition of data corresponding to the setting control value S and the measured value K at the time during the air conditioning control was carried out according to the flowchart to be graphically displayed on a data display section 39 of the display screen, as shown in FIG. 4, of the display unit 17 of the output device.

Next, an example of a facility control motoring method using the air conditioning control monitoring apparatus 3 having the aforementioned configuration will be described.

Although this example illustrates that the control logic of the VAV unit is traced by using time sequential data, the flowchart displayed by the facility control monitoring method according to of the present invention is not limited to the present embodiment in terms of a specific control object, control logic, type of a flowchart, or data display format.

The air conditioning control flow is displayed on the display screen shown in FIG. 1. The display screen includes a control flow display section 31 for displaying a flowchart, a set and measured data display section 33, and a trace controller 35 for setting time and date and subject items.

The flowchart is displayed by connecting, through lines, symbols 37a to 37d representing processing, determination, input/output, and terminals to each other according to the control logic.

Figure 2:
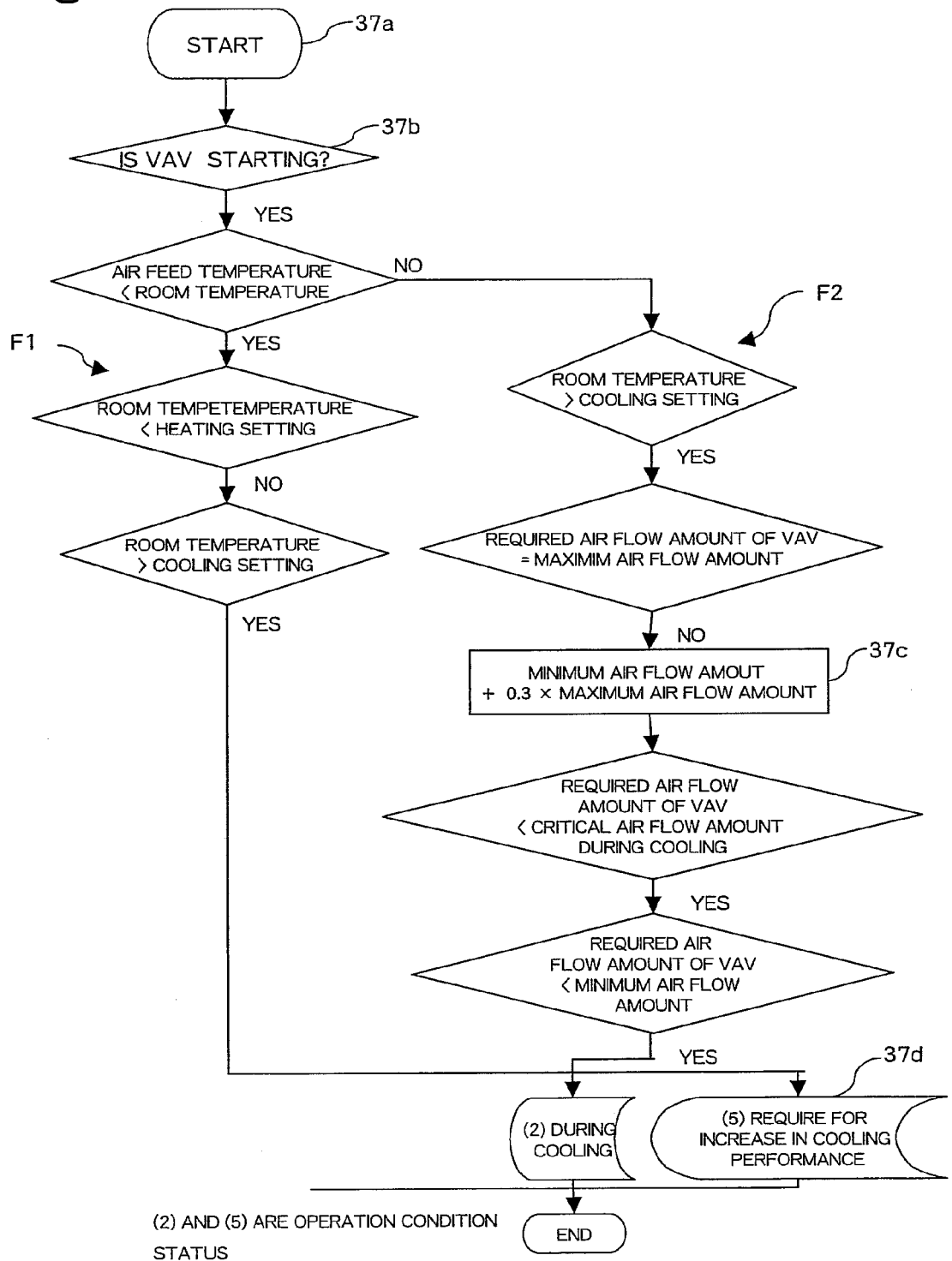
FIG. 2 is an enlarged view of the flowchart shown in FIG. 1.

In the related art, only the overall flowchart is displayed. However, in the facility control monitoring method according to the present invention, an arbitrary date and time can be specified by means of the trace controller 35 shown in FIG. 1, so that the control means 21 can retrieve in setting values of control parameters shown in FIG. 5 and time sequential data shown in FIG. 6 from the storage unit 15. In addition, the control means 21 allows a flowchart F1 representing the present control procedure and a flowchart F2 representing a past control procedure to be simultaneously displayed on the control flow display section 31 shown in FIG. 1. FIG. 2 is an enlarged view of the flowcharts in FIG. 1.

In this case, the display is carried out, for example, by tracing specific parts of the flowcharts. That is, the traced parts of the flowchart can be visually distinguished by using different colors, fonts, or styles for the symbols and lines. For example, the present control history may be displayed with yellow symbols and black thick lines, and a control history of, for example, ten minutes before the present control history may be displayed with red symbols and red lines. In addition, measured data corresponding to the display time of the flowcharts shown in FIG. 1 may be simultaneously displayed to match a time sequential graph 41 on the data display section 39 shown in FIG. 4 so that the control history of the control device 7 can be recognized.

Moreover, if a plurality of control flows exist, a flowchart of the control logic to be traced, may be input to a control logic display object setting section 43 as shown in FIG. 4, thereby allowing selection of a flowchart. Here, the input means is not limited to the control logic display object setting section 43, but may include the trace controller 35, for example.

In addition, the date and time when the control logic is to be traced can be specified on the time sequential graph of the data display section 39 shown in FIG. 4, as well as on the trace controller 35 shown in FIG. 1. Moreover, the method and place for displaying the graph are not limited to those shown in FIG. 4.

Furthermore, if the air conditioning system 1 experiences an error and the control means 21 receives an error signal from the control device 7 of the air conditioning system 1, the air conditioning control monitoring apparatus 3 automatically starts processing using the error signal as a triggering signal. That is, the air conditioning control monitoring apparatus 3 displays the error on the display unit 17 of the output device using the control means 21, and simultaneously displays control histories of the point of time when the error signal is generated and of an error in the past similar to the present error on the display unit 17 of the output device as a flowchart having predetermined steps, as necessary. In this case, for example, yellow symbols and black thick lines may represent the control history of the present error, and red symbols and red lines may represent the control history of the past error.

According to this facility control monitoring method, the procedure of the air conditioning control performed by the control device 7 is stored in the storage unit 15 and predetermined steps of the air conditioning control procedure at a specified date and time is displayed by a flowchart. Accordingly, the control logic can be visually traced. As a result, the control logic and setting parameters, which were previously regarded as a black box, can be recognized and a cause of an operation trouble caused by the control logic can be easily found.

In addition, a flowchart F of the same system having differently specified dates and times can be displayed on one display screen of the display unit 17 of the output device. When a certain room is abnormally subject to a high temperature condition, a flowchart F' representing a past air conditioning control procedure, similar to the control logic of the abnormal operation, in which normal operation was performed, are simultaneously displayed. Accordingly, it is possible to compare the operation control procedure and measured values (results) K with each other, so the suitability of the control logic and the setting control values (setting parameters) S can be rapidly and easily determined.

Moreover, with the flowchart, data corresponding to the setting control value S and the measured value K, which are obtained when the air conditioning control was carried out according to the flowchart, can be simultaneously displayed as numerical values on the same set and measured data display section 33 on one display screen of the display unit 17 of the output device. That is, the operation control can be visually recognized based on the flowchart, and, at the same time, the numerical setting parameters or results can be quantitatively recognized so that it is possible to precisely and easily trace the operation control.

In addition, when the operation control at a certain time is displayed using the flowchart, a transition of data corresponding to the setting control value S and the measured value K at the time during the operation control was performed, can be displayed on the data display section 39 in the form of a graph. In this case, the graph may include a general graph, such as, for example, a line graph, a bar graph, or a pie chart. As a result, it is possible to visually recognize the transition of the setting parameter S and the measured value K involved in the operation control so that the suitability of the control logic can be rapidly and easily determined.

As described above, according to the facility control monitoring method of the present invention, because the control procedure performed by the control device is stored and predetermined steps of the control procedure at a specified date and time can be displayed in the form of a flowchart, it is possible to visually trace the control logic. As a result, the control logic and setting parameters, which were previously regarded as a "black box" by users, can be easily recognized, thereby allowing a cause of an operation trouble caused by the control logic to be easily found. In addition, the facility control monitoring apparatus of the present invention includes a storage unit for storing an operation control value, a setting control value, and a measured value at predetermined intervals of time, a display device, an input device, and a control means for displaying predetermined steps of the operation control at a specified date and time as a flowchart. Accordingly, the operation history of a device to be controlled can be stored in the storage unit as the operation control value and an operation history at a desired date and time can be extracted from the stored operation history by means of the control means. In addition, the operation history can be displayed on the display device in the form of a flowchart. As a result, it is possible to visually trace a control logic at an arbitrary date and time.

INDUSTRIAL APPLICABILITY

The facility control monitoring method and facility control monitoring apparatus according to the present invention can be preferably used as a facility control monitoring method and a facility control monitoring apparatus for facilities for controlling devices to be controlled, for example, an air conditioner system, a refrigerator, a circulating pump or a generator.

The invention claimed is:

1. A facility control monitoring method for monitoring a control performed by a control device in a facility including a device to be controlled, the control device for controlling the operation of the device to be controlled, a setting device for transmitting a setting control value to the control device, and a sensor for transmitting an operational state measured value of the device to be controlled to the control device, the method comprising:

storing the control procedure performed by the control device;

specifying an arbitrary date and time; and displaying predetermined steps of the control procedure after the arbitrary date and time on a display device as a flowchart of the control procedure performed by the control device.

2. The facility control monitoring method according to claim 1, wherein flowcharts of different multiple lines are simultaneously displayed on one display screen of the display device.

3. The facility control monitoring method according to claim 1, wherein with a flowchart of the control procedure performed by the control device, a setting control value, and a measured value obtained when the control procedure was carried out according to the flowchart, are simultaneously displayed on one display screen of the display device as numerical values.

4. The facility control monitoring method according to claim 1, wherein a transition of the setting control value and the measured value obtained during the control was carried out according to the flowchart are displayed on a display screen of the display device as a graph.

* * * * *